United States Patent
Kawamura et al.

(10) Patent No.: US 7,643,924 B2
(45) Date of Patent: Jan. 5, 2010

(54) FAILURE DETERMINING APPARATUS AND METHOD FOR HYDRAULIC PRESSURE CONTROL CIRCUIT

(75) Inventors: Tatsuya Kawamura, Toyota (JP); Toshio Sugimura, Nagoya (JP); Hideo Masaki, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 556 days.

(21) Appl. No.: 11/640,277

(22) Filed: Dec. 18, 2006

(65) Prior Publication Data

US 2007/0142991 A1 Jun. 21, 2007

(30) Foreign Application Priority Data

Dec. 21, 2005 (JP) ............................... 2005-368216

(51) Int. Cl.
*G16H 61/12* (2006.01)
*G06F 19/00* (2006.01)
(52) U.S. Cl. ............................ 701/62; 701/29; 701/107
(58) Field of Classification Search .................. 701/62, 701/29, 31, 32, 33, 101, 102, 107; 192/3.3; 477/65, 176

See application file for complete search history.

(56) References Cited

U.S. PATENT DOCUMENTS

| 4,993,527 | A | * | 2/1991 | Benford et al. ................ 477/65 |
| 5,113,984 | A | * | 5/1992 | Benford ...................... 192/3.3 |
| 6,907,970 | B2 | | 6/2005 | Sugimura |
| 2004/0229728 | A1 | * | 11/2004 | Oshima et al. .............. 477/176 |

FOREIGN PATENT DOCUMENTS

| DE | 10 2004 022 929 A1 | 12/2004 |
| JP | 2004-340273 A | 12/2004 |
| JP | 2005-3193 A | 1/2005 |
| WO | 2004/094875 A1 | 11/2004 |

* cited by examiner

*Primary Examiner*—Tan Q Nguyen
(74) *Attorney, Agent, or Firm*—Sughrue Mion, PLLC

(57) ABSTRACT

An ECU executes a program that includes the steps of setting an abnormality flag when a hydraulic pressure switch is on even though a lock-up clutch is in a lock-up OFF state, forcing an SLU off when the lock-up clutch is on and the abnormality flag is on, determining that there is an SLU failure when the lock-up clutch is still in a lock-up ON state after a predetermined period of time has passed, and determining that there is a hydraulic pressure switch failure when the lock-up clutch is not in the lock-up ON state after the predetermined period of time has passed.

11 Claims, 7 Drawing Sheets

FIG.3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

FAILURE DETERMINING APPARATUS AND METHOD FOR HYDRAULIC PRESSURE CONTROL CIRCUIT

INCORPORATION BY REFERENCE

The disclosure of Japanese Patent Application No. 2005-368216 filed on Dec. 21, 2005, including the specification, drawings and abstract is incorporated herein by reference in its entirety.

BACKGROUND OF THE INVENTION

1. Field of the Invention

The invention relates to a hydraulic pressure control circuit, and more particularly, to a failure determining apparatus and method for a hydraulic pressure control circuit relating to a lock-up clutch.

2. Description of the Related Art

An automatic transmission mounted in a vehicle typically combines a torque converter and a gear type shift mechanism and is structured so as to automatically establish a predetermined shift speed by switching the power transmission path in the gear type shift mechanism by selectively operating a plurality of friction apply elements such as clutches and brakes.

This automatic transmission is provided with a hydraulic pressure control circuit which controls the supply and release of hydraulic fluid to and from actuators of the friction apply elements and a lock-up clutch of the torque converter.

Japanese Patent Application Publication No. JP-A-2005-3193 describes a torque converter in which, when controlling a lock-up clutch that enables the input side of the lock-up clutch to be directly connected to the output side of the lock-up clutch, in addition to simply controlling the lock-up clutch to an applied state and a released state, it can also be placed in a slip state by feedback controlling the application force of the lock-up clutch so that the rotation speed difference between a pump rotation speed on the input side (which corresponds to the engine speed) and a turbine rotation speed on the output side (which corresponds to an input shaft rotation speed of the automatic transmission) becomes a predetermined rotation speed difference.

In order to control the lock-up clutch to a slip state in this way (i.e., in order to execute slip control), a solenoid valve is provided in a hydraulic pressure control circuit of the lock-up clutch in order to adjust (regulate) the pressure difference between an apply side fluid chamber and a release side fluid chamber of the lock-up clutch. However, if there is an ON failure in the solenoid valve, the lock-up clutch becomes applied despite the fact that it desirable to have it in a slip state and engine stall ensues. Therefore, it is necessary to be able to determine an ON failure in the solenoid valve.

Japanese Patent Application Publication No. JP-A-2004-340273 describes technology for determining an ON failure in a solenoid valve. The technology described therein is an apparatus provided with a hydraulic pressure switch in a hydraulic pressure control circuit, which operates in response to the amount of hydraulic pressure output from the solenoid valve. When the hydraulic pressure switch is on even though no hydraulic pressure should be supplied, the apparatus determines that an ON failure has occurred in the solenoid valve.

However, when using a hydraulic pressure switch to determine an ON failure (i.e., the solenoid valve does not turn off even when an OFF command is issued) in a solenoid valve of a lock-up clutch, it is not possible to identify whether the failure is in the solenoid valve or in the hydraulic pressure switch.

Japanese Patent Application Publication No. JP-A-2004-340273 attempts to solve this problem by identifying whether there is an ON failure in the solenoid valve or an ON failure is in the hydraulic pressure switch based on the operating state of the hydraulic pressure switch when the ignition switch is off and no hydraulic pressure is output from the hydraulic pressure pump. With this technology, however, it is not possible to identify where the failure is until the ignition switch has been turned off, which means that there is a time delay until a failsafe routine targeted at the cause of the failure can be executed.

SUMMARY OF THE INVENTION

The invention provides a failure determining apparatus and method able to quickly identify whether there is a failure in a solenoid valve or a failure in a hydraulic pressure switch even while a vehicle is running.

A first aspect of the invention thus relates to a failure determining apparatus of a hydraulic pressure control circuit that includes a switching valve which switches a lock-up clutch of a fluid power transmitting device that transmits output of an internal combustion engine to a shift mechanism to an applied state; a solenoid valve which outputs hydraulic pressure for regulating a pressure difference between an apply side fluid chamber and a release side fluid chamber of the fluid power transmitting device; a hydraulic pressure switch that operates in response to an amount of hydraulic pressure output from the solenoid valve; a determining device that determines whether a failure has occurred in one of the solenoid valve and the hydraulic pressure switch based on an operating state of the hydraulic pressure switch when the lock-up clutch is in a released state; and an identifying device which, when the determining device has determined that there is a failure in one of the solenoid valve and the hydraulic pressure switch, identifies which, from among the solenoid valve and the hydraulic pressure switch, the failure has occurred in based on the application state of the lock-up clutch when the switching valve is instructed to supply hydraulic fluid to the apply side fluid chamber and discharge hydraulic fluid from the release side fluid chamber, and the solenoid valve is instructed not to output hydraulic pressure, wherein the hydraulic pressure control circuit releases the lock-up clutch by supplying hydraulic fluid to the release side fluid chamber and discharging hydraulic fluid from the apply side fluid chamber, and applies the lock-up clutch by supplying hydraulic fluid to the apply side fluid chamber and discharging hydraulic fluid from the release side fluid chamber using the switching valve, and regulating the pressure difference by outputting hydraulic pressure from the solenoid valve.

According to this failure determining apparatus of a hydraulic pressure control circuit, when the lock-up clutch is released (i.e., when hydraulic pressure is not being supplied from the solenoid valve) and the hydraulic pressure switch detects a predetermined abnormal hydraulic pressure value, a failure is occurring in either the hydraulic pressure switch that detected that hydraulic pressure is being supplied even though it is actually not, or in the solenoid valve that is actually supplying the hydraulic pressure. In this case, if the lock-up clutch is applied even though the solenoid valve is instructed not to output hydraulic pressure, it can be determined that there is a failure in the solenoid valve, but if the lock-up clutch is released, it can be determined that there is a failure in the hydraulic pressure switch. As a result, it is possible to identify whether the failure has occurred in the solenoid valve or in the hydraulic pressure switch even while the vehicle is running. Accordingly, a failsafe routine that targets the cause of the failure can be executed quickly. As a result, it is possible to provide a failure determining apparatus of a hydraulic pressure control circuit, which can quickly identify whether there is a failure in the solenoid valve or a failure in the hydraulic pressure switch, even while the vehicle is running.

A second aspect of the invention relates to a failure determining method of a hydraulic pressure control circuit. This failure determining method includes the steps of determining whether a failure has occurred in one of i) a solenoid valve which outputs hydraulic pressure for regulating a pressure difference between an apply side fluid chamber and a release side fluid chamber of a fluid power transmitting device that transmits output of an internal combustion engine to a shift mechanism, and ii) a hydraulic pressure switch that operates in response to an amount of hydraulic pressure output from the solenoid valve, based on an operating state of the hydraulic pressure switch when a lock-up clutch of the fluid power transmitting device is in a released state; and when it has been determined that a failure has occurred in one of the solenoid valve and the hydraulic pressure switch, identifying which, from among the solenoid valve and the hydraulic pressure switch, the failure has occurred in based on the application state of the lock-up clutch when a switching valve that switches the lock-up clutch to an applied state is instructed to supply hydraulic fluid to the apply side fluid chamber and discharge hydraulic fluid from the release side fluid chamber, and the solenoid valve is instructed not to output hydraulic pressure.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a clutch and brake application chart showing various application and release combinations of clutches and brakes to achieve specific speeds in the automatic transmission shown in FIG. 2;

DETAILED DESCRIPTION OF THE PREFERRED EMBODIMENTS

Figure 1:
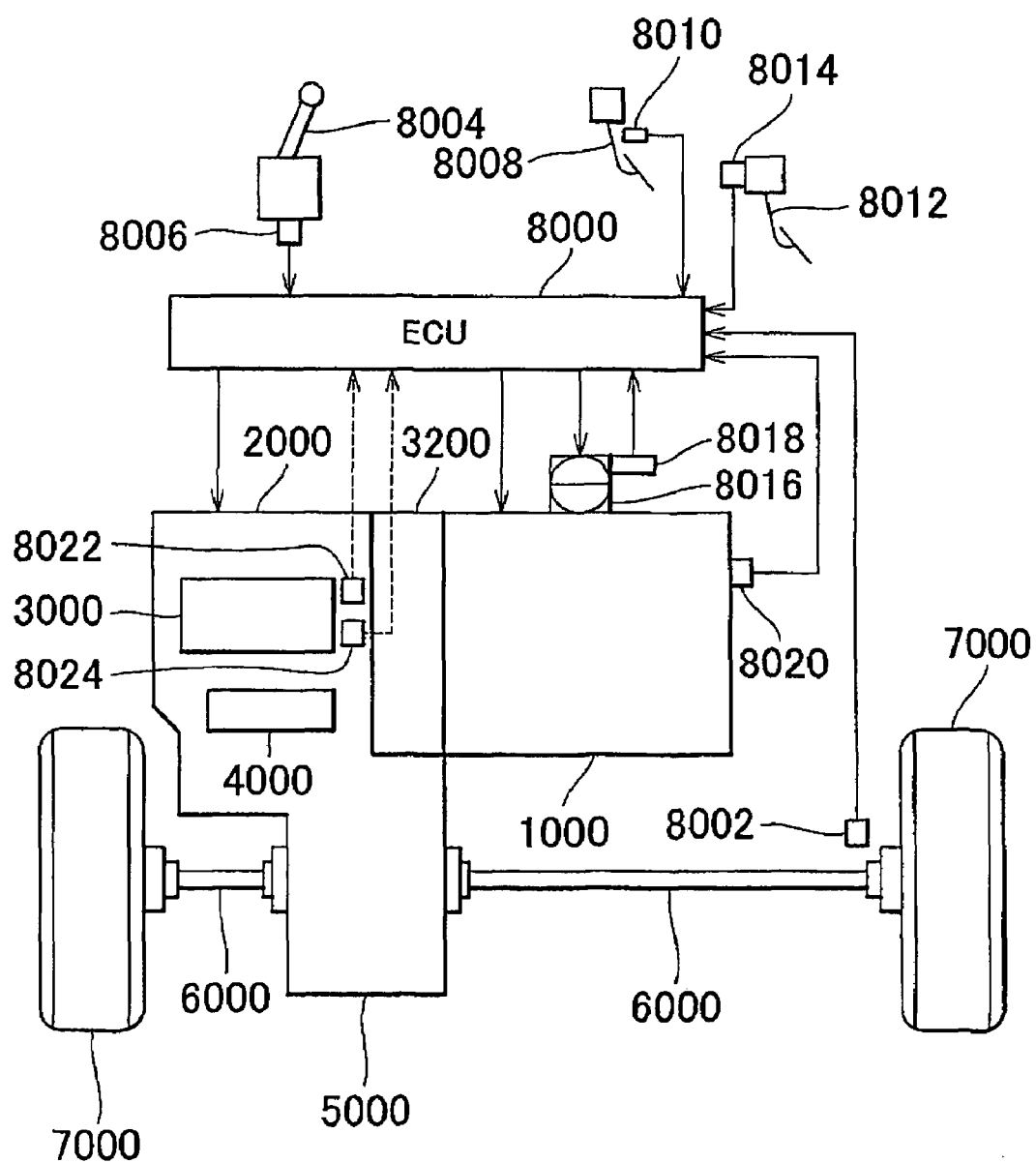
FIG. 1 is a block diagram schematically showing a power train that is controlled by an ECU which serves as a control apparatus according to a first example embodiment of the invention.

Hereinafter, example embodiments of the invention will be described in detail with reference to the accompanying drawings. In the following description, like parts with be denoted by like reference numerals. Like parts will also be referred to by same nomenclature and will have the same function. Therefore, detailed descriptions of those parts will not be repeated.

First Example Embodiment

A vehicle provided with a control apparatus which serves as an abnormality determining apparatus according to a first example embodiment of the invention will hereinafter be described with reference to FIG. 1. The vehicle described here is a FF (Front engine Front drive) vehicle, but it may also be a vehicle other than a FF vehicle.

The vehicle includes an engine 1000, an automatic transmission 2000, a planetary gear unit 3000 that constitutes part of the automatic transmission 2000, a hydraulic pressure controller 4000 that also constitutes part of the automatic transmission 2000, a differential gear 5000, a drive shaft 6000, front wheels 7000, and an ECU (Electronic Control Unit) 8000.

The engine 1000 is an internal combustion engine which burns a mixture of air and fuel injected by an injector, not shown, in a combustion chamber of a cylinder. Force generated by the combustion of this air-fuel mixture forces the piston down in the cylinder which in turn rotates a crankshaft.

The automatic transmission 2000 is coupled to the engine 1000 via a torque converter 3200 which is provided with a lock-up clutch. The automatic transmission 2000 changes the rotation speed of the crankshaft to a desired rotation speed by establishing a desired gear speed. This lock-up clutch is able to be placed in a completely released state, a completely applied state, and a slip state in between the two.

An output gear of the automatic transmission 2000 is in mesh with the differential gear 5000 which is connected by spline engagement or the like to the drive shaft 6000. Power is transmitted via the drive shaft 6000 to the left and right front wheels 7000.

Various switches and sensors are connected via a harness or the like to the ECU 8000. These switches and sensors include a vehicle speed sensor 8002, a shift lever position switch 8006 of a shift lever 8004, an accelerator opening amount sensor 8010 of an accelerator pedal 8008, a stroke sensor 8014 of a brake pedal 8012, a throttle opening amount sensor 8018 of an electronic throttle valve 8016, an engine speed sensor 8020, an input shaft rotation speed sensor 8022, and an output shaft rotation speed sensor 8024.

The vehicle speed sensor 8002 detects the vehicle speed from the rotation speed of the drive shaft 6000 and outputs a signal indicative thereof to the ECU 8000. The shift lever position switch 8006 detects the position of the shift lever 8004 and outputs a signal indicative thereof to the ECU 8000. A gear speed of the automatic transmission 2000 corresponding to the position of the shift lever 8004 is then automatically established. The automatic transmission 2000 may also be structured so that a manual shift mode whereby a driver can select an appropriate gear speed can be selected according to an operation by the driver.

The accelerator opening amount sensor 8010 detects the opening amount of the accelerator pedal 8008 and outputs a signal indicative thereof to the ECU 8000. The stroke sensor 8014 detects a stroke amount of the brake pedal 8012 and outputs a signal indicative thereof to the ECU 8000.

The throttle opening amount sensor 8018 detects an opening amount of the electronic throttle valve 8016 which is adjusted by an actuator and outputs a signal indicative thereof to the ECU 8000. This electronic throttle valve 8016 adjusts the amount of air drawn into the engine 1000 (i.e., adjusts the output of the engine 1000).

The engine speed sensor 8020 detects a rotation speed of an output shaft (i.e., the crankshaft) of the engine 1000 and outputs a signal indicative thereof to the ECU 8000. The input shaft rotation speed sensor 8022 detects an input shaft rotation speed NI of the automatic transmission 2000 and outputs a signal indicative thereof to the ECU 8000. The output shaft rotation speed sensor 8024 detects an output shaft rotation speed NOUT of the automatic transmission 2000 and outputs a signal indicative thereof to the ECU 8000. The input shaft rotation speed NI of the automatic transmission 2000 is equal to a turbine rotation speed NT (also referred to simply as "turbine speed NT") of the torque converter 3200, which will be described later.

The ECU 8000 controls various devices so that the vehicle runs in a desired manner based on the signals output from the vehicle speed sensor 8002, the shift lever position switch 8006, the accelerator opening amount sensor 8010, the stroke sensor 8014, the throttle opening amount sensor 8018, the engine speed sensor 8020, the input shaft rotation speed sensor 8022, and the output shaft rotation speed sensor 8024 and the like, as well as programs and maps stored in ROM (Read Only Memory).

In this example embodiment, when the shift lever 8004 is in a D (DRIVE) position, the ECU 8000 controls the automatic transmission 2000 so that a gear speed, from among first through sixth gear speeds, is automatically established according to a shift map that is set separately. Establishing one of the first to sixth gear speeds enables the automatic transmission 2000 to transmit driving force to the front wheels 7000.

Figure 2:
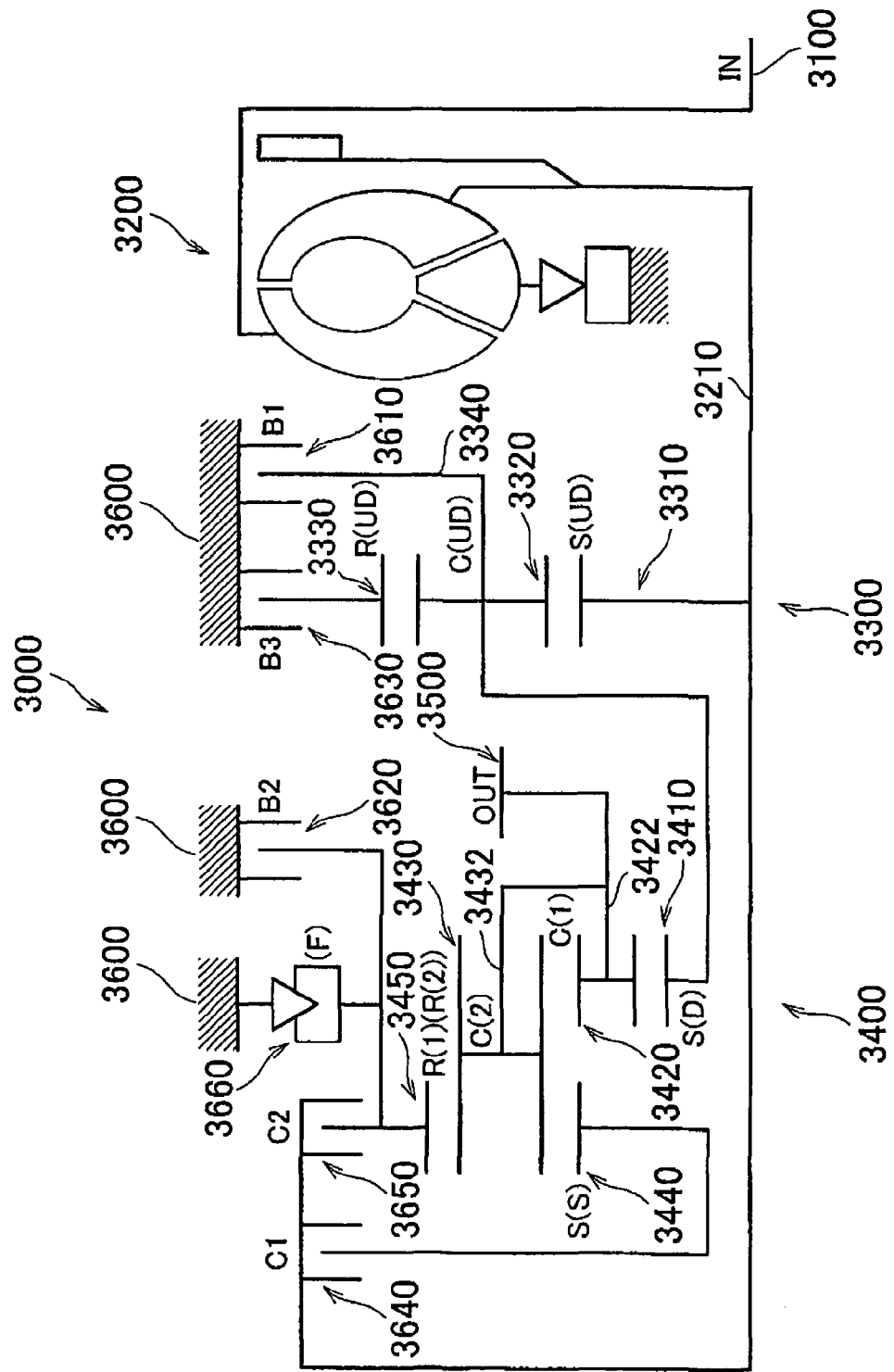
FIG. 2 is a skeleton view of a gear train in an automatic transmission.

The planetary gear unit 3000 will now be described with reference to FIG. 2. This planetary gear unit 3000 is connected to the torque converter 3200 which has an input shaft 3100 that is connected to the crankshaft. The planetary gear unit 3000 includes a first planetary gear set 3300; a second planetary gear set 3400; an output gear 3500; a B1 brake 3610, a B2 brake 3620, and a B3 brake 3630, all of which are fixed to a gear case 3600; a C1 clutch 3640 and a C2 clutch 3650; and a one-way clutch (F) 3660.

The first planetary gear set 3300 is a single pinion type planetary gear set which includes a sun gear S (UD) 3310, a pinion gear 3320, a ring gear R (UD) 3330, and a carrier C (UD) 3340.

The sun gear S (UD) 3310 is coupled to the output shaft 3210 of the torque converter 3200. The pinion gear 3320 is rotatably supported on the carrier C (UD) 3340 and in mesh with the sun gear S (UD) 3310 and the ring gear R (UD) 3330.

The ring gear R (UD) 3330 is selectively held to the gear case 3600 by the B3 brake 3630. The carrier C (UD) 3340 is selectively held to the gear case 3600 by the B1 brake 3610.

The second planetary gear set 3400 is a Ravigneaux type planetary gear set which includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

The sun gear S (D) 3410 is coupled to the carrier C (UD) 3340. The short pinion gear 3420 is rotatably supported on the carrier C (1) 3422 and in mesh with the sun gear S (D) 3410 and the long pinion gear 3430. The carrier C (1) 3422 is coupled to the output gear 3500.

The long pinion gear 3430 is rotatably supported on the carrier C (2) 3432 and in mesh with the sun gear S (S) 3440 and the ring gear R (1) (R (2)) 3450. The carrier C (2) 3432 is coupled to the output gear 3500.

The sun gear S (S) 3440 is selectively coupled to the output shaft 3210 of the torque converter 3200 by the C1 clutch 3640. The ring gear R (1) (R (2)) 3450 is selectively held to the gear case 3600 by the B2 brake 3620 and also selectively coupled to the output shaft 3210 of the torque converter 3200 by the C2 clutch 3650. The ring gear R (1) (R (2)) 3450 is also coupled to the one-way clutch (F) 3660 so that it is unable to rotate when the vehicle is driven in first speed.

The one-way clutch (F) 3660 is provided in parallel with the B2 brake 3620. That is, an outer race of the one-way clutch (F) 3660 is fixed to the gear case 3600 while an inner race is connected to the ring gear R (1) (R (2)) 3450 via a rotating shaft.

Figure 3:
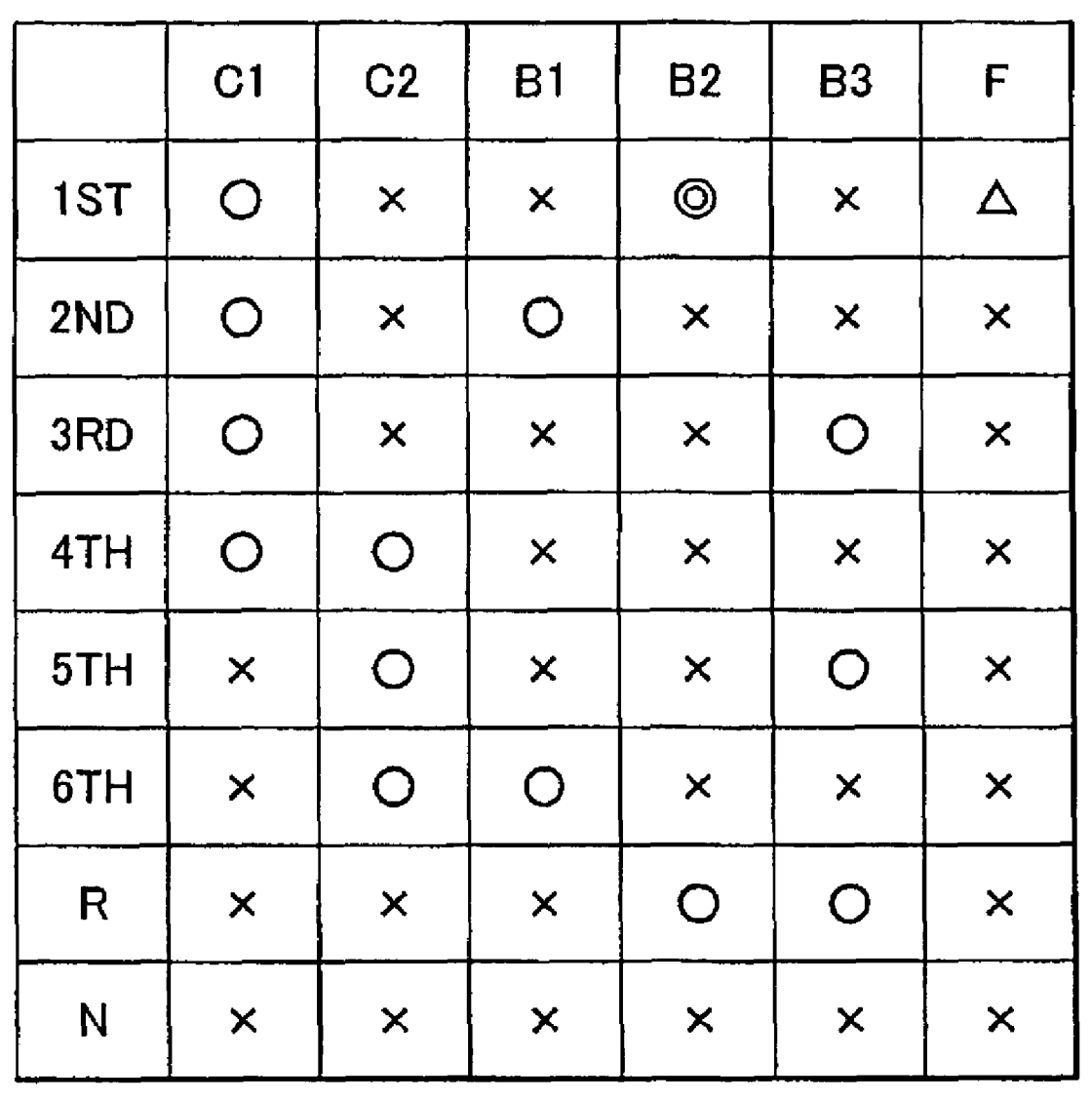

FIG. 3 is a clutch and brake application chart showing the relationship between the various gear speeds and the operating states of the clutches and brakes. Six forward gear speeds, i.e., first gear speed through sixth gear speed, as well as reverse are established by operating the brakes and clutches in the combinations shown in this clutch and brake application chart. In the drawing, a circle indicates that the brake or clutch is applied and an X indicates that the brake or clutch is released. In addition, a double circle indicates that the B2 brake is applied when the engine brake is on, and a triangle indicates that the one-way clutch (F) is applied when driving in first gear speed.

Figure 4:
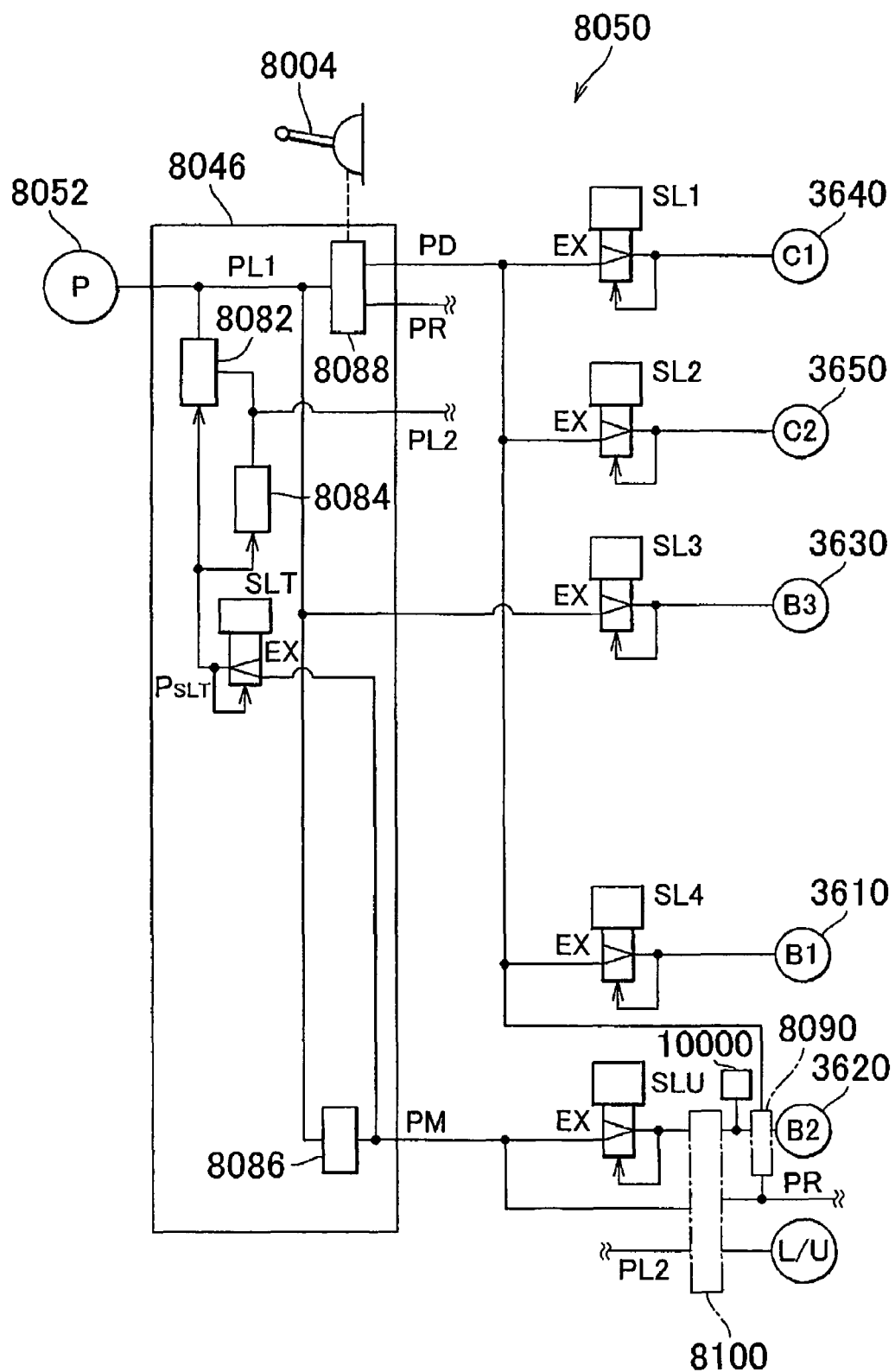
FIG. 4 is a diagram of a hydraulic pressure control circuit in the automatic transmission.

FIG. 4 is a circuit diagram relating to solenoid valves SL1 to SL4 and SLU which control the operation of the actuators of the clutches and brakes, as well as a lock-up clutch 9038. This drawing shows a hydraulic pressure control circuit 8050 which constitutes part of a hydraulic pressure controller 4000.

As shown in FIG. 4, the D range pressure (forward range pressure, forward hydraulic pressure) PD output from a hydraulic pressure supply device 8046 is regulated by the solenoid valves SL1, SL2, and SL4 and then supplied to the hydraulic pressure actuators (i.e., hydraulic pressure cylinders) of the C1 clutch 3640, the C2 clutch 3650, and the B1 brake 3610. The line hydraulic pressure PL1 (i.e., first line hydraulic pressure PL1) output from the hydraulic pressure supply device 8046 is regulated by the solenoid valve SL3 and then supplied to hydraulic pressure actuator of the B3 brake 3630.

Also, a D range pressure PD or a reverse pressure (reverse hydraulic pressure) PR supplied from the hydraulic pressure supply device 8046 is supplied via a B2 brake control circuit 8090 to the hydraulic pressure actuator of the B2 brake 3620. A control pressure $P_{SLU}$, which is the output hydraulic pressure of the linear solenoid valve SLU that makes a modulator hydraulic pressure PM output from the hydraulic pressure supply device 8046 the base pressure, is supplied via a switching circuit 8100 to the B2 brake control circuit 8090. Also, a hydraulic pressure switch 10000 is provided on the input side of the B2 brake control circuit 8090. This hydraulic pressure switch 10000 outputs a predetermined signal, such as an ON signal $SW_{ON}$, when the control pressure $P_{SLU}$ that is supplied to the B2 brake control circuit 8090 via the switching circuit 8100 becomes equal to or greater than a predetermined pressure for generating apply torque in the B2 brake 3620.

The hydraulic pressure supply device 8046 includes a primary regulator valve (i.e., a first regulator valve) 8082, a secondary regulator valve (i.e., a second regulator valve) 8084, a linear solenoid valve SLT, a modulator valve 8086, and a manual valve 8080. The primary regulator valve 8082 regulates a line hydraulic pressure PL1 (i.e., first line hydraulic pressure PL1) with the hydraulic pressure generated by a mechanical oil pump 8052 which is driven by the engine 1000 as the base pressure. The second regulator valve 8084 regulates a line pressure PL2 (i.e., second line hydraulic pressure PL2, secondary pressure PL2) with the hydraulic pressure discharged from the primary regulator valve 8082 as the base pressure. The linear solenoid valve SLT supplies a signal pressure $P_{SLT}$ to the first regulator valve 8082 and the second regulator valve 8084 to regulate the hydraulic pressure generated by the oil pump 8052 as the base pressure to the line hydraulic pressures PL1 and PL2 according to the load of the engine 1000 and the like. The modulator valve 8086 regulates the modulator hydraulic pressure PM to a constant value with the line hydraulic pressure PL1 as the base pressure. The manual valve 8080 outputs the line hydraulic pressure PL1, which was input by mechanically operating the shift lever 8004 which is mechanically linked via a cable or link or the like so as to switch the oil path, as the D range pressure PD when the shift lever 8004 is shifted into the D position, and as reverse pressure PR when the shift lever 8004 is shifted into the R position. In this way, the hydraulic pressure supply device 8046 supplies the line pressures PL1 and PL2, the D range pressure, and the reverse pressure PR.

The solenoid valves SL1 to SL4 and SLU all basically have the same structure. These solenoid valves SL1 to SL4 and SLU are independently energized and de-energized by the ECU 8000 to control the hydraulic pressure of each hydraulic pressure actuator independently, and hence control the apply pressure of the C1 clutch 3640, the C2 clutch 3650, the B1 brake 3610, the B2 brake 3620, and the B3 brake 3630.

Also, the linear solenoid valve SLU is a single (dual purpose) solenoid valve which alternatively controls the apply pressure of the B2 brake 3620 and the torque capacity of the lock-up clutch 9038 by switching the oil path using the switching circuit 8100. The B2 brake 3620 is a hydraulic pressure type friction apply element that applies only when the engine brake is on, as shown in FIG. 3. Because the lock-up clutch 9038 is controlled so that it does not lock up when the engine brake is on (particularly when the engine brake is on while running at low speeds), for example, in order to prevent engine stall, the apply pressure of the B2 brake 3620 and the torque capacity of the lock-up clutch 9038 do not need to be controlled simultaneously so a single (dual purpose) solenoid valve can be used for these controls.

Figure 5:
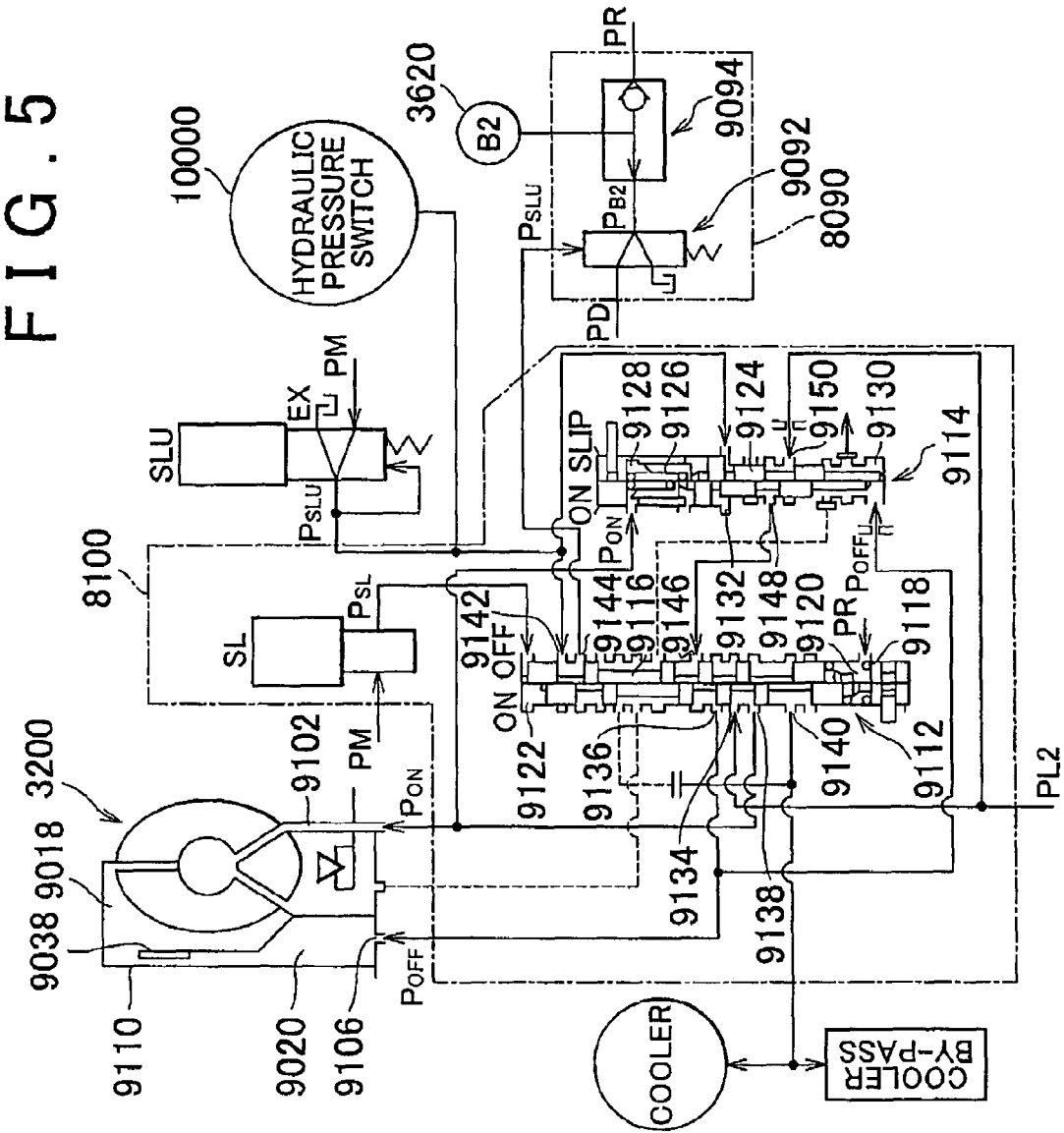
FIG. 5 is a view of a portion of the hydraulic pressure control circuit in the automatic transmission.

FIG. 5 is a schematic view of the B2 brake control circuit 8090 and the switching circuit 8100 and will be used to illustrate torque capacity control of the lock-up clutch 9038 and apply pressure control of the B2 brake 3620 by the linear solenoid valve SLU that is switched by the switching circuit 8100.

As shown in the drawing, the B2 brake control circuit 8090 includes a second brake control valve 9092 and a shuttle valve 9094. The second brake control valve 9092 outputs an apply pressure $P_{B2}$ for the B2 brake 3620 according to the control pressure $P_{SLU}$ with the D range pressure PD as the base pressure. The shuttle valve 9094 outputs either the reverse pressure PR or the hydraulic pressure $P_{B2}$ supplied from the second brake control valve 9092, to the B2 brake 3620. When the control pressure $P_{SLU}$ is supplied, the apply pressure $P_{B2}$ is output to the B2 brake 3620. When the reverse pressure PR is supplied, that reverse pressure PR is output to the B2 brake 3620.

The lock-up clutch 9038 is a hydraulic pressure type friction clutch in which friction is applied to a front cover 9110 according to the differential pressure $\Delta P$ ($=P_{ON}-P_{OFF}$) between a hydraulic pressure $P_{ON}$ in an apply side fluid chamber 9018 supplied via an apply fluid path 9102 and a hydraulic pressure $P_{OFF}$ in a release side fluid chamber 9020 supplied via a release fluid path 9106, as is well known. There are for example three main operating conditions of the torque converter 3200. The first operating condition is one in which the differential pressure $\Delta P$ is negative such that the lock-up clutch 9038 is released, i.e., in a so-called lock-up OFF state. The second operating condition is one in which the differential pressure $\Delta P$ is equal to or greater than zero such that the lock-up clutch 9038 is partially applied, i.e., in a so-called slip state. The third operating condition is one in which the differential pressure $\Delta P$ is at the maximum value such that the lock-up clutch 9038 is completely applied, i.e., in a so-called lock-up ON state. Further, when the lock-up clutch 9038 is in the slip state, there is no longer any torque distributed to it because the differential pressure $\Delta P$ is zero so the torque converter 3200 operates in the same manner that it does when the lock-up clutch 9038 is in the lock-up OFF state.

The switching circuit 8100 includes a lock-up relay valve 9112 and a lock-up control valve 9114. The lock-up relay valve 9112 is used to switch between a state in which the lock-up clutch 9038 is released, i.e., a lock-up OFF state, and a state in which the lock-up clutch 9038 is applied, i.e., a state that ranges from a slip state including a released state to the lock-up ON state. When the lock-up relay valve 9112 is placing the lock-up clutch 9038 in an applied state, the lock-up control valve 9114 regulates the differential pressure $\Delta P$ to adjust the operating state of the lock-up clutch 9038 within the range from the slip state including a released state to the lock-up ON state.

The lock-up relay valve 9112 includes a spool valve body 9116, a spring 9118 which is provided on one shaft end side of the spool valve body 9116 and applies urging force to the spool valve body 9116 that urges it toward the release (i.e., off) position, a fluid chamber 9120 that receives release pressure PR for urging the spool valve body 9116 to the OFF position, and a fluid chamber 9122 which is provided on the other shaft end side of the spool valve body to receive control pressure $P_{SL}$, which is the output hydraulic pressure of the ON-OFF solenoid valve SL in which the modulator pressure PM is the base pressure, for urging the spool valve body 9116 to the applied (i.e., ON) position. This ON-OFF solenoid valve SL is energized and de-energized by the ECU 8000 and functions as a control pressure generating valve that switches the lock-up clutch 9038 between an applied state and a released state.

The lock-up control valve 9114 includes a spool valve body 9124, a spring 9126 for applying urging force to the spool valve body 9124 that urges it to a slip (SLIP) position, a fluid chamber 9128 that receives hydraulic pressure $P_{ON}$ in the apply side fluid chamber 9018 of the torque converter 3200 for urging the spool valve body 9124 to the SLIP position, and a fluid chamber 9130 that receives hydraulic pressure $P_{OFF}$ in the release side fluid chamber 9020 of the torque converter 3200 for urging the spool valve body 9124 to the completely applied (i.e., ON) position. In the following description, the slip control signal $P_{SLU}$ output to the lock-up control valve 9114 may be described as a slip control signal pressure $P_{lin}$.

The switching circuit 8100 having this kind of structure switches the supply state of the operating hydraulic pressure to the apply side fluid chamber 9018 and the release side fluid chamber 9020, thereby switching the operating state of the lock-up clutch 9038, or controls the apply pressure of the B2 brake 3620 by supplying operating hydraulic pressure thereto.

First, a case will be described in which the lock-up clutch 9038 is in the lock-up OFF state and the control pressure $P_{SLU}$ is able to be supplied to the B2 brake 3620. When no control pressure $P_{SL}$ is supplied to the fluid chamber 9122 in the lock-up relay valve 9112 such that the spool valve body 9116 is urged to the release (i.e., OFF) position by the urging force of the spring 9118, the line pressure PL2 supplied to an input port 9134 is supplied from a release side port 9136 to the release side fluid chamber 9020 through the release oil path 9106. The hydraulic pressure that was discharged from the apply side port 9138 through the apply oil path 9102 via the apply side oil chamber 9018 is now discharged from a discharge port 9140 to an oil cooler and a cooler path. As a result, the lock-up clutch 9038 is placed in the lock-up OFF state.

Also, when the lock-up relay valve 9112 is switched to the release position, the control pressure $P_{SLU}$ supplied to the input port 9142 is able to be supplied to the B2 brake control circuit 8090 through the brake side port 9144. At this time, the B2 brake control circuit 8090 outputs apply pressure to the B2 brake 3620 from the linear solenoid valve SLU and the hydraulic pressure switch 10000 outputs an ON signal $SW_{ON}$ to the ECU 8000.

Next, a case will described in which the lock-up clutch 9038 is in a state ranging from the slip state including a released state to the lock-up ON state and the control pressure $P_{SLU}$ is unable to be supplied to the B2 brake 3620. When the control pressure $P_{SL}$ is supplied to the fluid chamber 9122 in the lock-up relay valve 9112 such that the spool valve body 9116 is urged to the apply (i.e., ON) position, the line pressure PL2 supplied to the input port 9134 is supplied from the apply side port 9138 to the apply side fluid chamber 9018 through the apply fluid path 9102. This line pressure PL2 supplied to the apply side fluid chamber 9018 becomes the hydraulic pressure $P_{ON}$. At the same time, the release side fluid chamber 9020 becomes communicated with the control port 9148 of the lock-up control valve 9114 via the release oil path 9106, the release side port 9136 and a bypass port 9146. The hydraulic pressure $P_{OFF}$ in the release side oil chamber 9020 is regulated by the lock-up control valve 9114, i.e., the differential pressure ΔP is regulated by the lock-up control valve 9114, to shift the operating state of the lock-up clutch 9038 within the range from the slip state to the lock-up ON state.

More specifically, when the spool valve body 9116 of the lock-up relay valve 9112 is urged to the apply position, i.e., when the lock-up clutch 9036 applied, and the control pressure $P_{SLU}$ to urge the spool valve body 9124 of the lock-up control valve 9114 into the completely applied (i.e., ON) position is not supplied to the fluid chamber 9132 so that the spool valve body 9124 is placed in the SLIP position by urging force of the spring 9126, line pressure PL2 that was supplied to the input port 9150 is supplied to the release side fluid chamber 9020 from the control port 9148 via the bypass port 9146, the release side port 9136, and the release oil path 9106. In this state, the slip state (including the released state) of the lock-up clutch 9038 is controlled by controlling the differential pressure ΔP with the control pressure $P_{SLU}$.

Also, when the spool valve body 9116 of the lock-up relay valve 9112 is urged into the applied position and the control pressure $P_{SLU}$ for urging the spool valve body 9124 in the lock-up control valve 9114 to the completely applied (i.e., ON) position is supplied to the fluid chamber 9132, the line pressure PL2 is not supplied from the input port 9150 to the release side fluid chamber 9020 and hydraulic fluid is discharged from the release side fluid chamber 9020. As a result, the differential pressure ΔP reaches its maximum such that the lock-up clutch 9038 becomes completely applied.

As shown in FIG. 5, the hydraulic pressure switch 10000 is provided to detect the slip control signal pressure $P_{lin}$ supplied from the linear solenoid valve SLU to the lock-up control valve 9114. This hydraulic pressure switch 10000 turns on when the slip control signal pressure $P_{lin}$ becomes equal to a preset pressure, at which time it outputs an ON signal to the ECU 8000. Also, the hydraulic pressure switch 10000 turns off when the slip control signal pressure $P_{lin}$ becomes equal to a preset pressure (a hysteresis is set to prevent hunting between on and off), at which time it outputs an OFF signal to the ECU 8000.

This kind of hydraulic pressure control circuit 8050 includes a lock-up relay valve 9112, a solenoid valve SLU (hereinafter simply referred to as "SLU"), and the hydraulic pressure switch 10000. The lock-up relay valve 9112 is a switching valve for switching the lock-up clutch 9038 to an applied state and is controlled by the control pressure $P_{SL}$ of the ON-OFF solenoid valve SL (hereinafter simply referred to as "SL") which is a control pressure generating valve. The SLU outputs the hydraulic pressure $P_{lin}$ for regulating the pressure difference ΔP between the apply side fluid chamber 9018 and the release side fluid chamber 9020 of the lock-up clutch 9038 to the lock-up control valve 9114. The hydraulic pressure switch 10000 operates in response to the amount of hydraulic pressure $P_{lin}$ output from the SLU.

Also, when the lock-up clutch 9038 is released (i.e., in the lock-up OFF state), the SL is off and the lock-up relay valve 9112 is in the OFF position, while the slip control signal hydraulic pressure $P_{lin}$ output from the SLU is zero. In this case, however, the lock-up OFF state is established regardless of the amount of slip control signal hydraulic pressure $P_{lin}$ output from the SLU. Hereinafter, the state in which the slip control signal hydraulic pressure $P_{lin}$ output from the SLU is zero will be described as an SLU OFF state.

Moreover, when the lock-up clutch 9038 is applied (i.e., in the lock-up ON state), the SL is on and the lock-up relay valve 9112 is in the ON position, while the hydraulic pressure $P_{lin}$ output from the SLU is at the maximum value and the lock-up control valve 9114 is in the ON position. Also, even if the SL is on and the lock-up relay valve 9112 is in the ON position, if the SLU is off, then the lock-up OFF state is established. Hereinafter, the state in which the slip control signal hydraulic pressure $P_{lin}$ output from the SLU is the maximum value will be referred to as an SLU ON state.

In the foregoing structure, when the hydraulic pressure switch 10000 is on even though the ECU 8000 is not outputting a command to turn the SLU on, there may be an ON failure in the SLU (i.e., a failure in which the SLU will not switch off). In this case, however, it is also possible that there is an ON failure in the hydraulic pressure switch 1000 (i.e., a failure in which the hydraulic pressure switch 1000 is constantly outputting an ON signal). Therefore, in order to execute a failsafe routine that targets the cause of the failure, it is necessary to identify which ON failure has occurred. The ECU 8000, i.e., the control apparatus which serves as the failure determining apparatus according to this example embodiment, thus identifies which ON failure has occurred.

Figure 6:
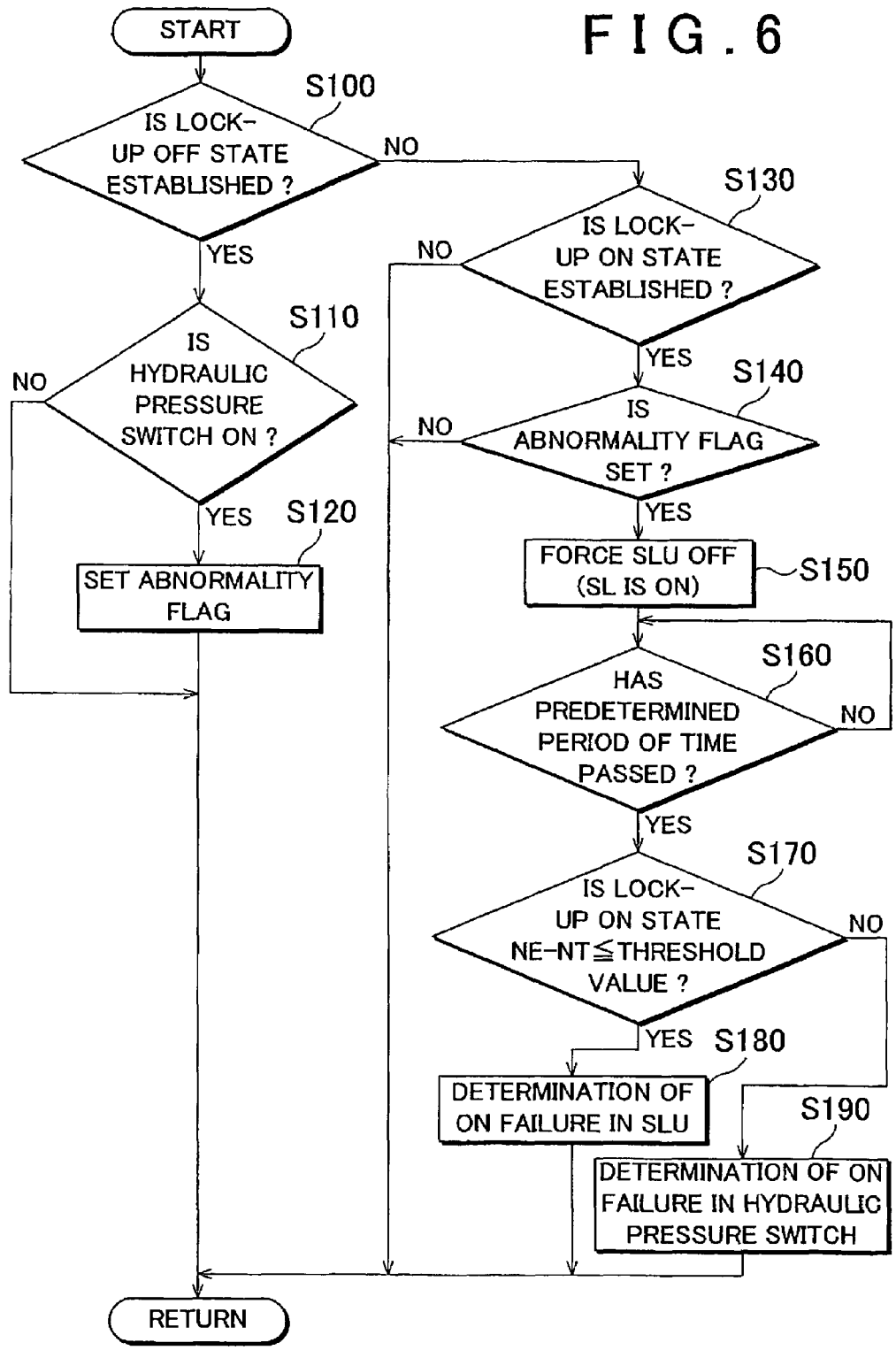
FIG. 6 is a flowchart illustrating the control structure of a program executed by the ECU which serves as the control apparatus according to the first example embodiment of the invention.

The control structure of a program executed by the ECU 8000 which serves as the control apparatus according to this example embodiment will now be described with reference to FIG. 6.

In step S100, the ECU 8000 determines whether the lock-up OFF state is established based on a command signal output from the ECU 8000 to the solenoid valves (SLU, SL). If the lock-up OFF state is established (i.e., YES in step S100), the process proceeds on to step S110. If not (i.e., NO in step S100), the process proceeds on to step S130.

In step S110, the ECU 8000 determines whether the hydraulic pressure switch 10000 is on based on a signal input to the ECU 8000 from the hydraulic pressure switch 10000. If the hydraulic pressure switch is on (i.e., YES in step S110), the process proceeds on to step S120. If not (i.e., NO in step S110), the routine ends.

In step S120, the ECU 8000 sets an abnormality flag, after which the routine ends. Setting the abnormality flag refers to setting the abnormality flag to ON.

In step S130, the ECU 8000 determines whether the lock-up ON state is established based on a command signal output from the ECU 8000 to the solenoid valves (SLU and SL). If the lock-up ON state is established (i.e., YES in step S130), the process proceeds on to step S140. If not (i.e., NO in step S130), the routine ends.

In step S140, the ECU 8000 determines whether the abnormality flag is set. If the abnormality flag is set (i.e., YES in step S140), the process proceeds on to step S150. If not (i.e., NO in step S140), the routine ends.

In step S150, the ECU 8000 outputs a command signal to a drive electric circuit to force the SLU to turn off. At this time, an ON command is being output to the SL.

In step S160, the ECU 8000 determines whether a predetermined period of time has passed after the command was output to force the SLU to turn off. If the predetermined amount of time has passed (i.e., YES in step S160), the process proceeds on to step S170. If not (i.e., NO in step S160), step S160 is repeated until the predetermined period of time has passed.

In step S170, the ECU 8000 determines whether the lock-up clutch 9038 is in the lock-up ON state. If the difference between the engine speed NE and the turbine speed NT (i.e., engine speed NE—turbine speed NT) is equal to or less than a threshold value, the lock-up clutch 9038 is determined to be in the lock-up ON state. If the lock-up clutch 9038 is in the lock-up ON state (i.e., YES in step S170), the process proceeds on to step S180. If not (i.e., NO in step S170), the process proceeds on to step S190.

In step S180, the ECU 8000 determines that there is an ON failure in the SLU. In step S190, the ECU 8000 determines that there is an ON failure in the hydraulic pressure switch 10000.

That is, when the SLU is turned off, the SL is ON. Therefore, if the SLU is operating normally and receives an OFF command, at least the lock-up clutch should be placed in the lock-up OFF state. If, however, the lock-up clutch is in the lock-up ON state, it is determined that there is a failure in which the SLU will not switch off (i.e., an ON failure in the SLU). On the other hand, if the lock-up clutch is no longer in the lock-up ON state, it is determined that the SLU is operating normally and there is a failure in which the hydraulic pressure switch 10000 will not turn off (i.e., an ON failure in the hydraulic pressure switch 10000).

The operation to determine whether the abnormality is a SLU abnormality or a hydraulic pressure switch 10000 abnormality, which is controlled by the ECU 8000 that serves as the control apparatus according to this example embodiment and based on the foregoing structure and flowchart will now be described.

[Case of an SLU Abnormality]

If the hydraulic pressure switch 10000 is on (i.e., YES in step S110) even though the ECU 8000 is outputting a lock-up OFF command to release the lock-up clutch 9038 (i.e., YES in step S100), the abnormality flag is set (S120).

If the abnormality flag is set (i.e., YES in step S140) in the apply range of the lock-up clutch 9038 (lock-up ON state) (YES in step S130), an attempt is made to force the SLU off to release the lock-up clutch 9038 (S150).

Because there is an abnormality (an ON failure) in the SLU, even after the predetermined period of time has passed (i.e., YES in step S160) the SLU will not turn off even if a signal to turn it off is actually output. Therefore, the lock-up clutch 9038 remains in the lock-up ON state (i.e., YES in step S170). Accordingly, it is determined that there is an ON failure (i.e., an abnormality) in the SLU (S180).

[Case of a Hydraulic Pressure Switch 10000 Abnormality]

If the abnormality flag was set (step S120) such that the abnormality flag is set (i.e., YES in step S140) in the apply region of the lock-up clutch 9038 (lock-up ON state) (YES in step S130), even if a predetermined period of time has passed after the SLU was forced off (i.e., YES in step S160), the SLU turns off when a signal to turn it off is actually output because the SLU is operating normally. Therefore, the lock-up clutch 9038 is no longer in the lock-up ON state (i.e., NO in step S170). Accordingly, it is determined that there is an ON failure (i.e., an abnormality) in the hydraulic pressure switch 10000 (S190).

As described above, when a hydraulic pressure switch is provided at the directed output of the SLU, an attempt is made to force the lock-up clutch off in the lock-up ON region, at which time it is determined whether the lock-up clutch remains on based on the actual rotational difference between the engine speed NE and the turbine speed. As a result, it is possible to distinguish between whether the abnormality is in the SLU or in the hydraulic pressure switch.

MODIFIED EXAMPLE 1

The process of step S130 may also be like that of step S132 described below. Incidentally, the process of step S132 is similar to the process of step S170.

In step S132, the ECU 8000 determines whether the lock-up clutch 9038 is in the lock-up ON state. If the difference between the engine speed NE and the turbine speed NT (i.e., engine speed NE—turbine speed NT) is equal to or less than a threshold value, then it is determined that the lock-up clutch 9038 is in the lock-up ON state. If the lock-up clutch 9038 is in the lock-up ON state (i.e., YES in step S132), the process proceeds on to step S140. If not (i.e., NO in step S132), the routine ends.

MODIFIED EXAMPLE 2

The process of step S130 may also be like that of step S134 described below.

In step S134, the ECU 8000 determines whether the lock-up clutch 9038 can be placed in the lock-up ON state based on the vehicle speed and the accelerator opening amount. If the lock-up clutch 9038 can be placed in the lock-up ON state (i.e., YES instep S134), the process proceeds onto step S140. If not (i.e., NO instep S134), the routine ends.

As a result, the lock-up clutch 9038 applies (or remains applied) when there is an actual ON failure in the SLU. However, because the lock-up clutch 9038 can be placed in the lock-up ON state based on the vehicle speed and the accelerator opening amount, no harm will be done if there is an ON failure in the SLU which results in the lock-up clutch 9038 applying or remaining applied.

Second Example Embodiment

Hereinafter, a second example embodiment of the invention will be described. In this example embodiment, the hardware configuration is the same as that of the first example embodiment, but the program which is executed by the ECU 8000 is different. In the first example embodiment described above, an attempt is made to force the SLU off in the region where the lock-up clutch 9038 can be turned on. Thus, even if there is an ON failure in the SLU, the lock-up clutch 9038 is already in a region where it can be turned on so no harm is done. In this example embodiment, it is determined whether the ON failure is in the SLU or the hydraulic pressure switch 10000 when the lock-up clutch 9038 is not in a region where it can be turned on.

Figure 7:
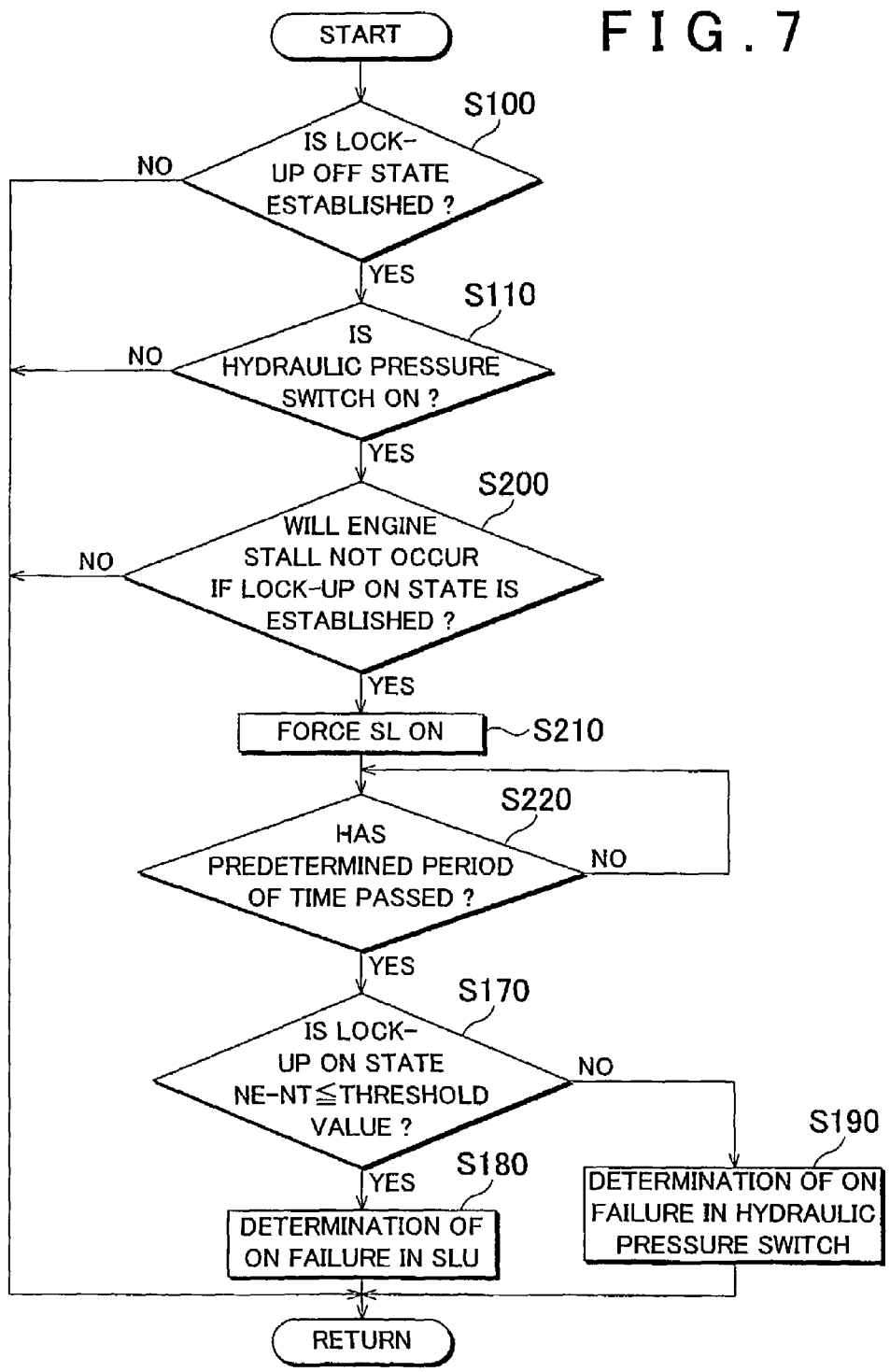
FIG. 7 is a flowchart illustrating the control structure of a program executed by the ECU which serves as the control apparatus according to the second example embodiment of the invention.

The control structure of a program executed by the ECU 8000 which serves as the control apparatus according to this example embodiment will now be described with reference to FIG. 7. Steps in the flowchart in FIG. 7 that are the same as steps in the flowchart in FIG. 6 will be denoted by like step numbers. Further, the processes of like steps are the same so detailed descriptions thereof will not be repeated.

In step S200, the ECU 8000 determines whether the engine will stall if the lock-up clutch 9038 is placed in the lock-up ON state based on, for example, the vehicle speed and the turbine speed. More particularly, it is determined that the engine will not stall even if the lock-up clutch 9038 is placed in the lock-up ON state if the gear type shift mechanism is in a neutral state. If it is determined hat the engine will not stall even if the lock-up clutch 9038 is placed in the lock-up ON state (i.e., YES in step S200), the process proceeds on to step S210. If not (i.e., NO in step S200), the routine ends.

In step S210, the ECU 8000 outputs a command signal to the drive electric circuit to forced the SL to turn on. At this time, an OFF command is being output to the SLU (i.e., YES in step S100).

In step S220, the ECU 8000 determines whether a predetermined period of time has passed after the command was output to force the SL to turn on. If the predetermined period of time has passed (i.e., YES in step S220), the process proceeds on to step S170. If not (i.e., NO in step S220), step S220 is repeated until the predetermined period of time has passed.

The operation to determine whether the abnormality is a SLU abnormality or a hydraulic pressure switch 10000 abnormality, which is controlled by the ECU 8000 that serves as the control apparatus according to this example embodiment and based on the foregoing structure and flowchart will now be described.

[Case of an SLU Abnormality]

If the hydraulic pressure switch 10000 is on (i.e., YES in step S110) despite the fact that the ECU 8000 is outputting a lock-up OFF command to release the lock-up clutch 9038 (i.e., YES in step S100), then it is determined whether the engine will stall if the lock-up clutch 9038 is placed in the lock-up ON state (S200).

If it is determined that the engine will not stall (i.e., YES in step S200), then the ECU 8000 tries to apply the lock-up clutch 9038 by forcing the SL to turn on in the release region of the lock-up clutch 9038 (lock-up OFF state) (YES in step S100).

Even after the predetermined period of time has passed (i.e., YES in step S220), there is an abnormality (i.e., an ON failure) in the SLU so the SLU is on when an ON signal is actually output to the SL. As a result, the lock-up ON state is established (i.e., YES in step S170). Therefore, it is determined that there is an ON failure (i.e., an abnormality) in the SLU (S180).

[Case of Hydraulic Pressure Switch 10000 Abnormality]

When the hydraulic pressure switch 10000 is on (i.e., YES in step S110) even though a lock-up OFF command is being output to release the lock-up clutch 9038 (i.e., YES in step S100), it is determined whether the engine will stall if the lock-up clutch 9038 is placed in the lock-up ON state (S200).

If it is determined that the engine will not stall (i.e., YES in step S200), then the ECU 8000 tries to apply the lock-up clutch 9038 by forcing the SL to turn on in the release region of the lock-up clutch 9038 (lock-up OFF state) (YES in step S100).

Even after the predetermined period of time has passed (i.e., YES in step S220), the SLU is operating normally and is thus off even when an ON command is actually output to the SL. As a result, the lock-up ON state is not established (i.e., NO in step S170). Therefore, it is determined that there is an ON failure (i.e., abnormality) in the hydraulic pressure switch 10000 (S190).

As described above, when a hydraulic pressure switch is provided at the directed output of the SLU, an attempt is made to force the lock-up clutch on (i.e., force the SL on) in the lock-up OFF region, at which time it is determined whether the lock-up clutch turns on based on the actual rotational difference between the engine speed NE and the turbine speed. As a result, it is possible to distinguish between whether the abnormality is in the SLU or the hydraulic pressure switch.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A failure determining apparatus of a hydraulic pressure control circuit, comprising:
    a switching valve which switches a lock-up clutch of a fluid power transmitting device that transmits output of an internal combustion engine to a shift mechanism to an applied state;
    a solenoid valve which outputs hydraulic pressure for regulating a pressure difference between an apply side fluid chamber and a release side fluid chamber of the fluid power transmitting device;
    a hydraulic pressure switch that operates in response to an amount of hydraulic pressure output from the solenoid valve;
    a determining device that determines whether a failure has occurred in one of the solenoid valve and the hydraulic pressure switch based on an operating state of the hydraulic pressure switch when the lock-up clutch is in a released state; and
    an identifying device which, when the determining device has determined that there is a failure in one of the solenoid valve and the hydraulic pressure switch, identifies which, from among the solenoid valve and the hydraulic pressure switch, the failure has occurred in based on the application state of the lock-up clutch when the switching valve is instructed to supply hydraulic fluid to the apply side fluid chamber and discharge hydraulic fluid from the release side fluid chamber, and the solenoid valve is instructed not to output hydraulic pressure,
    wherein the hydraulic pressure control circuit releases the lock-up clutch by supplying hydraulic fluid to the release side fluid chamber and discharging hydraulic fluid from the apply side fluid chamber, and applies the lock-up clutch by supplying hydraulic fluid to the apply side fluid chamber and discharging hydraulic fluid from the release side fluid chamber using the switching valve, and regulating the pressure difference by outputting hydraulic pressure from the solenoid valve.

2. The failure determining apparatus of a hydraulic pressure control circuit according to claim 1, wherein in one case, from among a case in which the lock-up clutch is applied and a case in which lock-up clutch is to be applied, the identifying device instructs the solenoid valve not to output hydraulic pressure and identifies which, from among the solenoid valve and the hydraulic pressure switch, the failure has occurred in based on the application state of the lock-up clutch.

3. The failure determining apparatus of a hydraulic pressure control circuit according to claim 1, wherein the identifying device instructs the switching valve to supply hydraulic fluid to the apply side fluid chamber and discharge hydraulic fluid from the release side fluid chamber on a condition that engine stall will not occur if the lock-up clutch is applied, and identifies which, from among the solenoid valve and the hydraulic pressure switch, the failure has occurred in based on the application state of the lock-up clutch.

4. The failure determining apparatus of a hydraulic pressure control circuit according to claim 3, wherein the condition is determined based on a vehicle speed and a turbine speed of the fluid power transmitting device.

5. The failure determining apparatus of a hydraulic pressure control circuit according to claim 1, wherein the application state of the lock-up clutch is determined based on a turbine speed of the fluid power transmitting device and a speed of the internal combustion engine.

6. A failure determining apparatus of a hydraulic pressure control circuit, comprising:
   a switching valve which switches a lock-up clutch to an applied state;
   a solenoid valve which outputs hydraulic pressure for regulating a pressure difference between an apply side fluid chamber and a release side fluid chamber of the lock-up clutch;
   a hydraulic pressure switch that operates in response to an amount of hydraulic pressure output from the solenoid valve;
   determining means for determining whether a failure has occurred in one of the solenoid valve and the hydraulic pressure switch based on an operating state of the hydraulic pressure switch when the lock-up clutch is in a released state; and
   identifying means for, when the determining means has determined that there is a failure in one of the solenoid valve and the hydraulic pressure switch, identifying which, from among the solenoid valve and the hydraulic pressure switch, the failure has occurred in based on the application state of the lock-up clutch when the switching valve is instructed to supply hydraulic fluid to the apply side fluid chamber and discharge hydraulic fluid from the release side fluid chamber, and the solenoid valve is instructed not to output hydraulic pressure,
   wherein the hydraulic pressure control circuit releases the lock-up clutch by supplying hydraulic fluid to the release side fluid chamber and discharging hydraulic fluid from the apply side fluid chamber, and applies the lock-up clutch by supplying hydraulic fluid to the apply side fluid chamber and discharging hydraulic fluid from the release side fluid chamber using the switching valve, and regulating the pressure difference by outputting hydraulic pressure from the solenoid valve.

7. A failure determining method of a hydraulic pressure control circuit, comprising the steps of:
   determining whether a failure has occurred in one of i) a solenoid valve which outputs hydraulic pressure for regulating a pressure difference between an apply side fluid chamber and a release side fluid chamber of a fluid power transmitting device that transmits output of an internal combustion engine to a shift mechanism, and ii) a hydraulic pressure switch that operates in response to an amount of hydraulic pressure output from the solenoid valve, based on an operating state of the hydraulic pressure switch when a lock-up clutch of the fluid power transmitting device is in a released state; and
   when it has been determined that a failure has occurred in one of the solenoid valve and the hydraulic pressure switch, identifying which, from among the solenoid valve and the hydraulic pressure switch, the failure has occurred in based on the application state of the lock-up clutch when a switching valve that switches the lock-up clutch to an applied state is instructed to supply hydraulic fluid to the apply side fluid chamber and discharge hydraulic fluid from the release side fluid chamber, and the solenoid valve is instructed not to output hydraulic pressure.

8. The failure determining method of a hydraulic pressure control circuit according to claim 7, wherein in one case, from among a case in which the lock-up clutch is applied and a case in which the lock-up clutch is to be applied, and when it has been determined that a failure has occurred in one of the solenoid valve and the hydraulic pressure switch, the solenoid valve is instructed not to output hydraulic pressure and identification of which, from among the solenoid valve and the hydraulic pressure switch, the failure has occurred in is made based on the application state of the lock-up clutch.

9. The failure determining method of a hydraulic pressure control circuit according to claim 7, wherein when it has been determined that a failure has occurred in one of the solenoid valve and the hydraulic pressure switch, identification of which, from among the solenoid valve and the hydraulic pressure switch, the failure has occurred in is made based on the application state of the lock-up clutch after the switching valve has been instructed to supply hydraulic fluid to the apply side fluid chamber and discharge hydraulic fluid from the release side fluid chamber on the condition that engine stall will not occur if the lock-up clutch is applied.

10. A failure determining method of a hydraulic pressure control circuit according to claim 9, wherein the condition is determined based on a vehicle speed and a turbine speed of the fluid power transmitting device.

11. A failure determining method of a hydraulic pressure control circuit according to claim 7, wherein the application state of the lock-up clutch is determined based on a turbine speed of the fluid power transmitting device and a speed of the internal combustion engine.

* * * * *